United States Patent
Zhou et al.

(10) Patent No.: US 11,616,449 B2
(45) Date of Patent: Mar. 28, 2023

(54) POWER ADAPTER

(71) Applicant: Delta Electronics (Shanghai) CO., LTD, Shanghai (CN)

(72) Inventors: Jian Zhou, Shanghai (CN); Haibin Song, Shanghai (CN); Daofei Xu, Shanghai (CN); Jinfa Zhang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 17/212,056

(22) Filed: Mar. 25, 2021

(65) Prior Publication Data
US 2021/0313897 A1    Oct. 7, 2021

(30) Foreign Application Priority Data
Apr. 3, 2020 (CN) .......................... 202010258072.1

(51) Int. Cl.
*H02M 3/335* (2006.01)
*H02M 1/08* (2006.01)
*H02M 1/00* (2006.01)

(52) U.S. Cl.
CPC ....... *H02M 3/33576* (2013.01); *H02M 1/007* (2021.05); *H02M 1/008* (2021.05);
(Continued)

(58) Field of Classification Search
CPC ............. H02M 3/335; H02M 3/33561; H02M 3/33576; H02M 1/34; H02M 1/342; H02M 1/344
See application file for complete search history.

(56) References Cited

U.S. PATENT DOCUMENTS

| 4,847,742 A | 7/1989 | Ohashi et al. |
| 5,400,239 A | 3/1995 | Caine |

(Continued)

FOREIGN PATENT DOCUMENTS

| CN | 1582525 A | 2/2005 |
| CN | 102255481 A | 11/2011 |

(Continued)

OTHER PUBLICATIONS

The Extended European Search Report dated Aug. 27, 2021 for EP patent application No. 21163006.6.
(Continued)

*Primary Examiner* — Gary L Laxton
(74) *Attorney, Agent, or Firm* — Qinghong Xu

(57) ABSTRACT

A power adapter, includes: a transformer, including a primary winding and a secondary winding; a primary circuit, including a primary main switch, electrically coupled to the primary winding; a secondary circuit, including a first switch unit and a second switch unit; a first end of the first switch unit and a first end of the second switch unit are coupled to the secondary winding of the transformer, and a second end of the first switch unit and a second end of the second switch unit connected to a first output port and a second output port, respectively; a control circuit, configured to detect output voltages of the first output port and the second output port, and controlling the primary main switch, the first switch unit and the second switch unit to adjust the output voltages of the first output port and the second output port.

16 Claims, 15 Drawing Sheets

(52) U.S. Cl.
CPC ......... *H02M 1/0067* (2021.05); *H02M 1/083* (2013.01); *H02M 3/33561* (2013.01)

(56) References Cited

U.S. PATENT DOCUMENTS

| | | | | |
|---|---|---|---|---|
| 6,462,962 | B1 * | 10/2002 | Cuk | ........................ H02M 1/34 363/16 |
| 6,504,267 | B1 | 1/2003 | Giannopoulos | |
| 6,549,432 | B1 | 4/2003 | Giannopoulos et al. | |
| 6,552,917 | B1 | 4/2003 | Bourdillon et al. | |
| 6,813,163 | B2 | 11/2004 | Inoue et al. | |
| 7,092,259 | B2 * | 8/2006 | Jacobs | .............. H02M 3/33569 363/20 |
| 7,538,527 | B2 * | 5/2009 | O'Driscoll | ........ H02M 3/33561 323/267 |
| 2003/0086279 | A1 | 5/2003 | Bourdillon | |
| 2006/0181230 | A1 | 8/2006 | Hosotani et al. | |
| 2008/0058028 | A1 | 3/2008 | Nakayama | |
| 2011/0018344 | A1 | 1/2011 | Liao et al. | |
| 2013/0127248 | A1 | 5/2013 | Lai | |
| 2013/0148388 | A1 | 6/2013 | Yang | |
| 2014/0347005 | A1 | 11/2014 | Zhou et al. | |
| 2015/0015071 | A1 | 1/2015 | Deboy et al. | |
| 2016/0359426 | A1 | 12/2016 | Jitaru et al. | |
| 2017/0047838 | A1 | 2/2017 | Lin | |
| 2017/0331378 | A1 | 11/2017 | Song et al. | |
| 2020/0091758 | A1 | 3/2020 | Jahan et al. | |

FOREIGN PATENT DOCUMENTS

| | | |
|---|---|---|
| CN | 103051211 A | 4/2013 |
| CN | 103731031 A | 4/2014 |
| CN | 104283444 A | 1/2015 |
| CN | 106385091 A | 2/2017 |
| CN | 107592021 A | 1/2018 |
| CN | 207427014 U | 5/2018 |
| CN | 109474046 A | 3/2019 |
| CN | 209134305 U | 7/2019 |
| WO | 2016172684 A1 | 10/2016 |

OTHER PUBLICATIONS

The Extended European Search Report dated Jul. 27, 2021 for EP patent application No. 21166411.5.
The First Office Action dated Apr. 26, 2022 of Chinese Patent No. 202010258177.7.
The First Office Action dated May 7, 2022 of Chinese Patent No. 202110292275.7.
The Non-Final Office Action dated Aug. 16, 2022 for U.S. Appl. No. 17/158,278.
Final Rejection dated Jan. 19, 2023 of U.S. Appl. No. 17/158,278.
The 2nd Office Action dated Jan. 28, 2023 of Chiese Application No. 202110292275.7.
Non-Final Rejection dated Jan. 31, 2023 of U.S. Appl. No. 17/158,278.

* cited by examiner

POWER ADAPTER

CROSS REFERENCE TO RELATED APPLICATION

The present application is based upon and claims the priorities of Chinese Patent Application No. 202010258072.1, titled "A POWER ADAPTER" filed on Apr. 3, 2020, and Chinese Patent Application No. 202110292275.7, titled "A POWER ADAPTER" filed on Mar. 18, 2021. The entire content of the Chinese patent applications is incorporated herein by reference.

TECHNICAL FIELD

The present disclosure relates to the field of power electronics, in particular, to a power adapter.

BACKGROUND

Nowadays, miniaturization becomes a development trend of power adapters. In order to meet different requirements for different devices, USB PD type-C power adapters become more and more popular.

In applications of power adaptors, a flyback circuit is widely used because of its simple circuit structure, limited number of components, and multiple outputs to be set from a single flyback circuit. In the prior art, two or more output ports are generally connected to a same flyback circuit. As shown in FIG. 1, a transformer has two secondary windings, two output ports are respectively connected to corresponding secondary windings through a secondary circuit, and a primary circuit is coupled to an input port through a bus capacitor and a rectifier circuit. In this structure, since output voltages of the two output ports are directly related to turn ratios of the respective secondary windings, a ratio of the output voltages of the two output ports is fixed, which cannot meet requirements of USB PD type-C and other interfaces at the same time that requires independent control of the output voltage.

In another prior art, as shown in FIG. 2, one output port of the power adapter is directly connected to an output terminal of the flyback circuit 230, and the other output port is connected to the flyback circuit 230 through a BUCK circuit 240. Although this structure may achieve independent control of the output voltages of the two output ports, an output voltage of the BUCK circuit 240 cannot be higher than an output voltage of the flyback circuit 230. Therefore, functions of the two output ports are not completely equivalent, and they cannot meet the requirements of USB PD type-C and other interface at the same time. And due to the additional BUCK circuit, the volume and cost of the adaptor may be increased.

In summary, how to achieve independent voltage adjustment and flexible power distribution of different output ports of the power adapter is a technical problem that needs to be solved urgently.

It should be noted that the information disclosed in the above background section is only for enhancing the understanding of the background of the present disclosure, and therefore may include information that does not constitute prior art known to those of ordinary skill in the art.

SUMMARY

A purpose of the present disclosure is to provide a power adapter, so as to realize independent adjustment of output voltages and flexible distribution of output power for different output ports of the power adapter.

According to an embodiment of the present disclosure, a power adapter is provided, including: a transformer, including a primary winding and a secondary winding, a primary circuit, including a primary main switch, electrically coupled to the primary winding; a secondary circuit, including a first switch unit and a second switch unit, a first end of the first switch unit and a first end of the second switch unit being coupled to the secondary winding of the transformer, a second end of the first switch unit being connected to a first output port, a second end of the second switch unit being connected to a second output port, and each of the first output port and the second output port being configured to supply power to a corresponding load; a control circuit, configured to detect output voltages of the first output port and the second output port respectively, and control the primary main switch, the first switch unit and the second switch unit to adjust the output voltages of the first output port and the second output port.

It should be understood that the above general description and the following detailed description are only exemplary and explanatory, and it is not intended to limit the present disclosure.

BRIEF DESCRIPTION OF THE DRAWINGS

The drawings herein are incorporated into and constitute a part of this specification, show embodiments consistent with this disclosure, and are used together with the specification to explain the principles of this disclosure. Obviously, the drawings in the following description are only some embodiments of the present disclosure. For those of ordinary skilled in the art, without paying any creative work, other drawings can be obtained based on these drawings.

DETAILED DESCRIPTION

Figure 1:
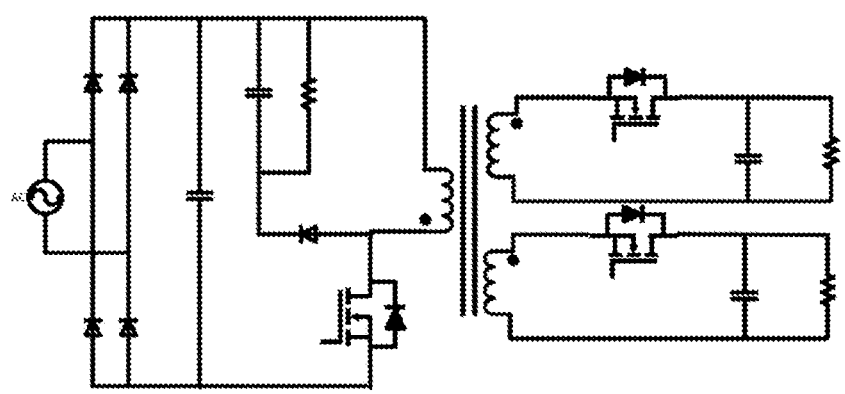
FIG. 1 schematically shows a circuit structure diagram of a power adapter in the prior art.
Figure 2:
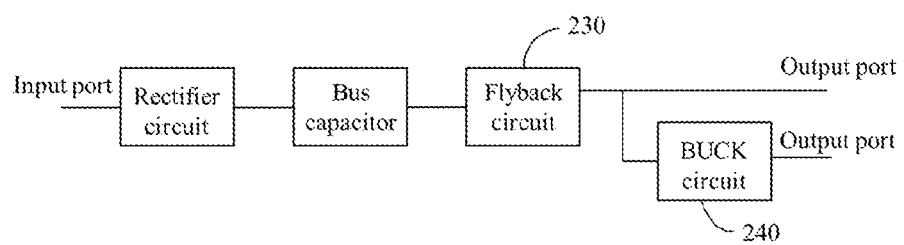
FIG. 2 schematically shows a schematic structural diagram of another power adapter in the prior art.

Example embodiments will now be described more fully with reference to the drawings. However, the example embodiments may be implemented in various forms, and should not be construed as being limited to the examples set forth herein; on the contrary, providing these embodiments makes the present disclosure more comprehensive and complete, and fully conveys the concept of the exemplary embodiments to those skilled in the art.

Furthermore, the described features, structures, or characteristics may be combined in one or more embodiments in any suitable manner. In the following description, many specific details are provided to give a full understanding of the embodiments of the disclosure. However, those skilled in the art will realize that the technical solutions of the present disclosure may be practiced without one or more of the specific details, or other methods, components, devices, steps, and the like, may be used. In other instances, well-known methods, devices, implementations, or operations have not been shown or described in detail to avoid obscuring aspects of the present disclosure.

The block diagrams shown in the drawings are merely functional entities and do not necessarily correspond to physically independent entities. That is, these functional entities may be implemented in the form of software, or implemented in one or more hardware modules or integrated circuits, or implemented in different networks and/or processor devices and/or micro control circuit devices entity.

The flow charts shown in the drawings are only exemplary illustrations, and do not necessarily include all contents and operations/steps, nor to be executed in the order described. For example, some operations/steps may further be decomposed, and some operations/steps may be merged or partially merged, so the order of actual execution may change according to the actual situation.

Figure 3A:
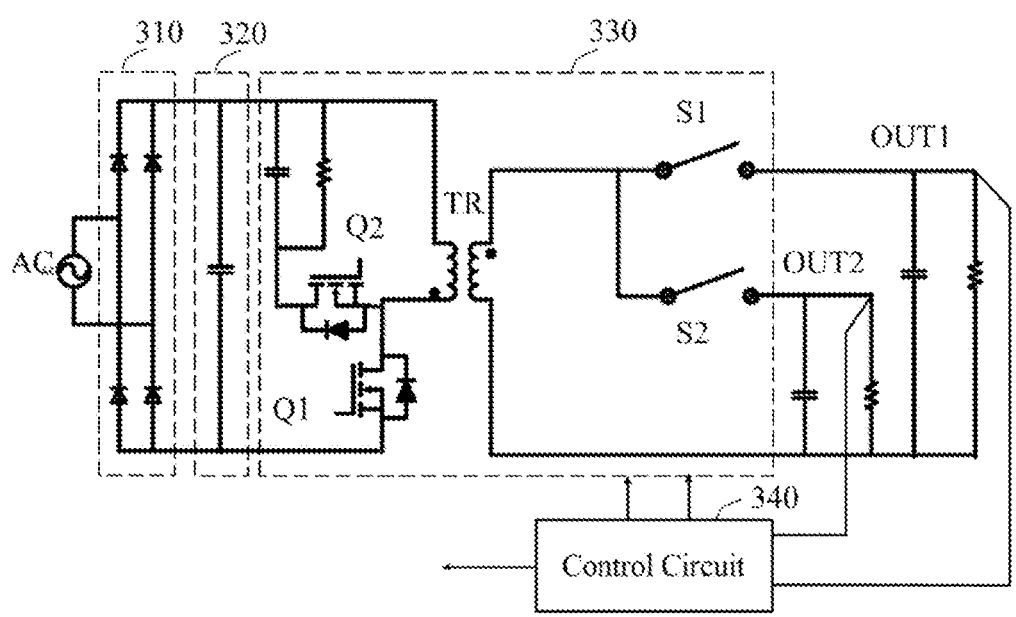
FIG. 3a schematically shows a circuit structure diagram of a power adapter according to an embodiment of the present disclosure.

An embodiment of the present disclosure provides a power adapter. FIG. 3a provides a schematic diagram of a circuit structure of the power adapter according to the embodiment. As shown in FIG. 3a, the power adapter has two output ports, such as a first output port OUT1 and a second output port OUT2. However, the number of output ports is not limited thereto. In other embodiments, there may be three or more output ports. Further, the power adapter in the embodiment of the present disclosure further includes a rectifier circuit 310, a bus capacitor 320, and a flyback circuit 330. The rectifier circuit 310 has an input end connected to an AC power supply, and an output end connected to the bus capacitor 320. The flyback circuit 330 has an input end connected to the bus capacitor 320, and output ends respectively coupled to a corresponding output port. The flyback circuit 330 includes: a transformer TR, including a primary winding and a secondary winding; a primary circuit, including a primary main switch Q1, electrically coupled to the primary winding; a secondary circuit, including two switch units, such as a first switch unit S1 and a second switch unit S2. A first end of the first switch unit S1 and a first end of the second switch unit S2 are coupled to the secondary winding of the transformer TR. A second end of the first switch unit S1 is correspondingly coupled to the first output port OUT1, and a second end of the second switch unit S2 is correspondingly coupled to the second output port OUT2. And each output port is used to supply power to a corresponding load.

In some embodiments, the first switch unit S1 and the second switch unit S2 may be the bidirectional switch unit. The bidirectional switch unit may realize conduction or block of a bidirectional voltage and a bidirectional current, that is, may realize a block of the bidirectional voltage and conduction of the bidirectional current.

In some embodiments, the bidirectional switch unit may include a plurality of switch devices, and the plurality of switch devices are connected in series, parallel, or series-parallel. Further, in some embodiments, the switch device may be a power device such as a MOSFET, GaN, or SiC, which is not limited thereto. In some embodiments, the switch device may also be formed by IGBT and reverse-parallel diode connected at two ends of IGBT. For a switch device with a reverse-conduction function, two switch devices should be connected in reverse-series to avoid a reverse-conduction and prevent a current flowing from a high output voltage end to a low output voltage end. In other embodiments, the bidirectional switch unit may also be formed by connecting the switch devices and the diodes connected in series and then in reverse-parallel, which is not limited thereto.

Figure 3B:
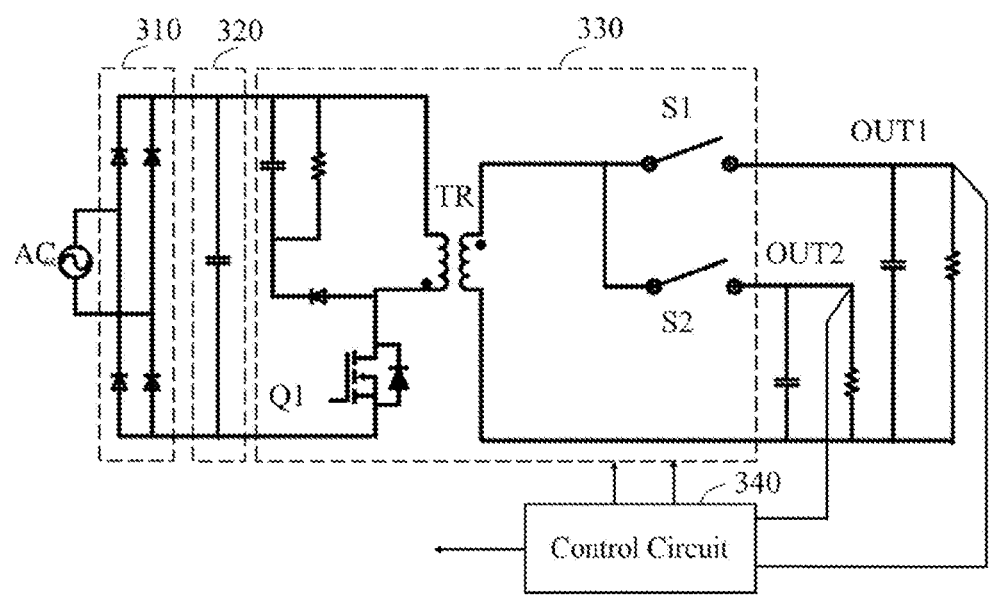
FIG. 3b schematically shows a circuit structure diagram of a power adapter according to another embodiment of the present disclosure.

In some embodiments, the flyback circuit 330 further includes an active clamp circuit, connected with the primary winding in parallel or connected with the primary main switch Q1 in parallel. The active clamp circuit includes a clamping switch and a clamping capacitor connected in series. The clamping switch may be power switch Q2 shown in FIG. 3a, or the clamping switch may be diode shown in FIG. 3b.

In practical applications, the power adapter may have multiple output ports, and the secondary circuit of the transformer includes multiple switch units. The second end of each of the switch units is coupled to one corresponding output port. By controlling the switch unit, the output voltages and output power of the multiple output ports may be controlled, and the independent adjustment of the output voltage and the flexible distribution of output power for the multiple output ports may be achieved.

Further, the power adapter further includes a control circuit 340, and the control circuit 340 detects output voltages of the first output port and the second output port. The control circuit 340 controls the primary main switch, the first switch unit, and the second switch unit according to the output voltages.

In some embodiments, the control circuit 340 generates a feedback signal to control the primary main switch Q1 according to the output voltage of one of the output ports, and controls corresponding switch unit according to the output voltage of other output ports. In some embodiments, the control circuit 340 includes a first control circuit and a second control circuit, the first control circuit detects the output voltage of one of the output ports, and generates a feedback signal to control the primary main switch Q1 according to the output voltage of the one of the output ports, and the second control circuit detects the output voltage of the other output ports, and controls the corresponding switch unit according to the output voltage of the other output ports.

Figure 3C:
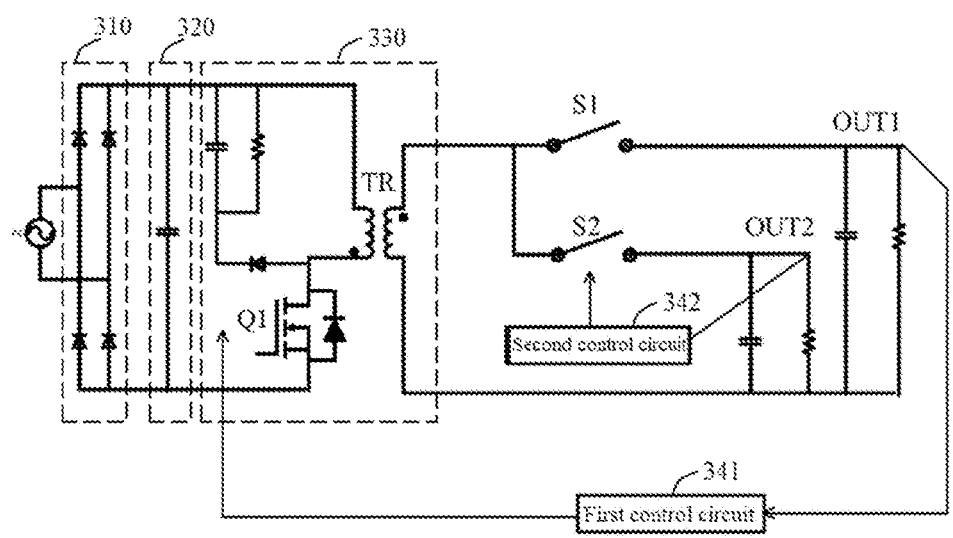
FIG. 3c schematically shows a circuit structure diagram of a power adapter according to an embodiment of the present disclosure.

Specifically, as shown in FIG. 3c, the power adapter includes a first control circuit 341 and a second control circuit 342. The first control circuit 341 generates a feedback signal to control the primary main switch Q1 according to an output voltage of one of the output ports (for example, the first output port OUT1), and the second control circuit 342 controls a corresponding switch unit (for example, the second switch unit S2) according to the output voltage of another output port (for example, the second output port OUT2). Further, in some embodiments, the first switch unit S1 doesn't need to be controlled according to the output voltage of the first output port OUT1. Alternatively, in some other embodiments, the first control circuit 341 may control the primary main switch Q1 according to the output voltage of the second output port OUT2, and the second control circuit 342 controls the first switch unit S1 according to the output voltage of the first output port OUT1, and the second switch unit S2 doesn't need to be controlled according to the output voltage of the second output port OUT2, which is not limited herein.

In some embodiments, the primary main switch and the switch unit may be controlled by one control circuit (for example, the control circuit 340), or by different control circuits (for example, the first control circuit 341 and the second control circuit 342). In some embodiments, the first control circuit 341 and the second control circuit 342 may be independent control chips or may be integrated together, which is not limited herein.

Figure 4:
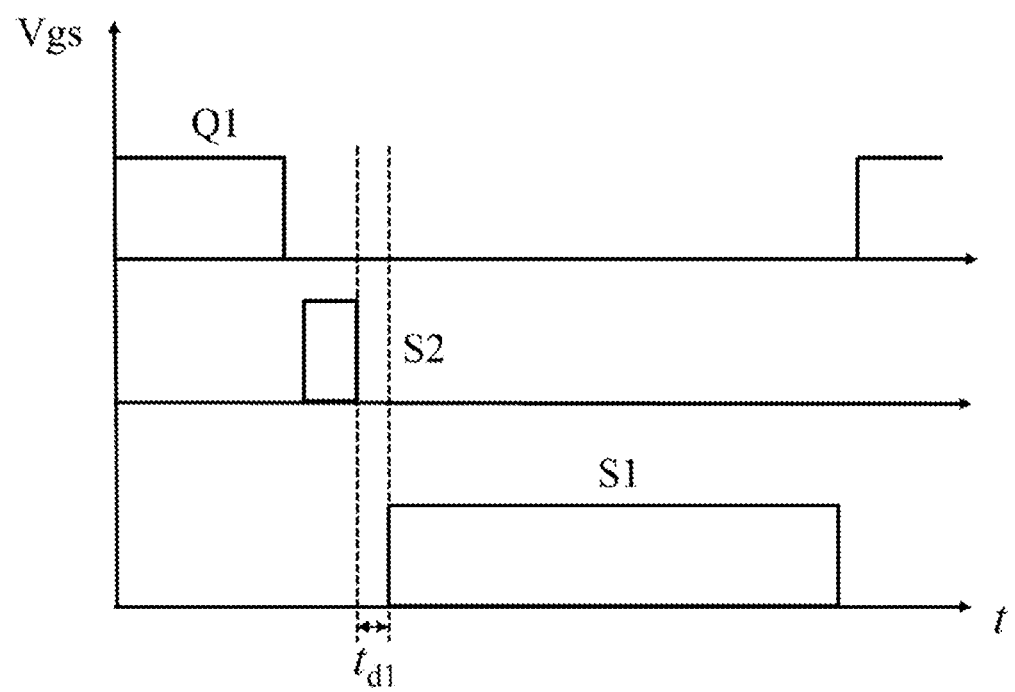
FIG. 4 schematically shows a timing diagram of driving signals of primary main switch, the first switch unit and the second switch unit in a power adapter in an embodiment of the present disclosure.

Further, during a turn-off period of the primary main switch Q1, the control circuit may control the multiple switch units to be turned on alternatively to adjust the output voltage of corresponding output ports. The control circuit may set a dead time between switching operations of the first switch unit S1 and the second switch unit S2. Taking the two switch units in FIG. 3 as an example, FIG. 4 shows a timing diagram of driving signals of primary main switch, the first switch unit and the second switch unit according to an embodiment of the present disclosure. As shown in FIG. 4, during the turn-off period of the primary main switch Q1, the control circuit 340 controls the first switch unit S1 and the second switch unit S2 to be turned on alternatively, and the control circuit further set a dead time $t_{d1}$ between the switching operations of the first switch unit S1 and the second switch unit S2 to prevent the first switch unit S1 and the second switch unit S2 from both being in a turn-on state. In this embodiment, the control circuit may control the second switch S2 to be turned on first, and the first switch S1 to be turned on later, which is not limited in this disclosure. In other embodiments, the control circuit may also control the first switch S1 to be turned on first and the second switch S2 to be turned on later.

Further, in some embodiments, the control circuit controls the switch unit with a low output voltage to be turned on first, and the switch unit with a high output voltage to be turned on later. Specifically, for example, if the output voltage of the second output port OUT2 is lower than the output voltage of the first output port OUT1, the control circuit may control the second switch unit S2 of the second output port OUT2 to be turned on first, and control the first switch unit S1 of the first output port OUT1 to be turned on later. Further, the first control circuit 341 may detect the output voltage of the first output port OUT1, control the primary main switch Q1 according to the output voltage of the first output port OUT1, and after the primary main switch Q1 is turned off, the second control circuit 342 controls the second switch unit S2 to be turned on first according to the output voltage of the second output port OUT2, and the first switch unit S1 may not need to be controlled according to its output voltage, that is, the first switch unit S1 may be turned on after the second switch unit S2 is turned off, and S1 may be turned off when a current of the secondary winding drops to zero.

Figure 5:
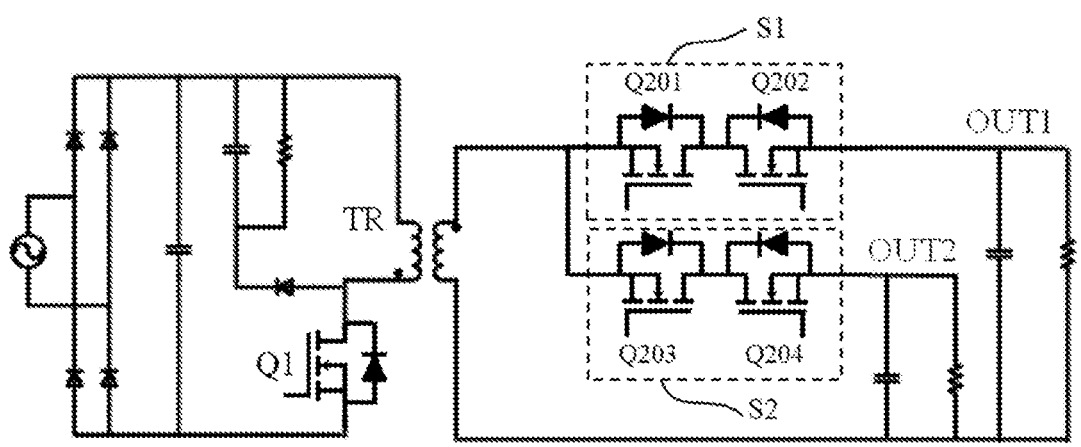
FIG. 5 is a schematic diagram showing a circuit structure of a power adapter according to another embodiment of the present disclosure.

Specifically, in some embodiments, as shown in FIG. 5, the first switch unit S1 includes a first switch Q201 and a second switch Q202 connected in reverse-series, and the second switch unit S2 includes a third switch Q203 and a fourth switch Q204 connected in reverse-series. In this embodiment, a source of the first switch Q201 is connected to the secondary winding, a drain of the first switch Q201 is connected to a drain of the second switch Q202, and a source of the second switch Q202 is connected to the first output port OUT1; a source of the third switch Q203 is connected to the secondary winding, a drain of the third switch Q203 is connected to a drain of the fourth switch Q204, and a source of the fourth switch Q204 is connected to the second output port OUT2. The first switch Q201, the second switch Q202, the third switch Q203, and the fourth switch Q204 may be MOSFETs or GaN, SiC devices, which is not limited herein. In other embodiments, the first switch Q201, the second switch Q202, the third switch Q203, and the fourth switch Q204 may also be implemented by IGBT with reverse-paralleled diode.

In other embodiments, the drain of the first switch Q201 may also be connected to the secondary winding, the source of the first switch Q201 is connected to the source of the second switch Q202, the drain of the second switch Q202 is connected to the first output port OUT1; the drain of the third switch Q203 is connected to the secondary winding, the source of the third switch Q203 is connected to the source of the fourth switch Q204, and the drain of the fourth switch Q204 is connected to the second output port OUT2.

Figure 6:
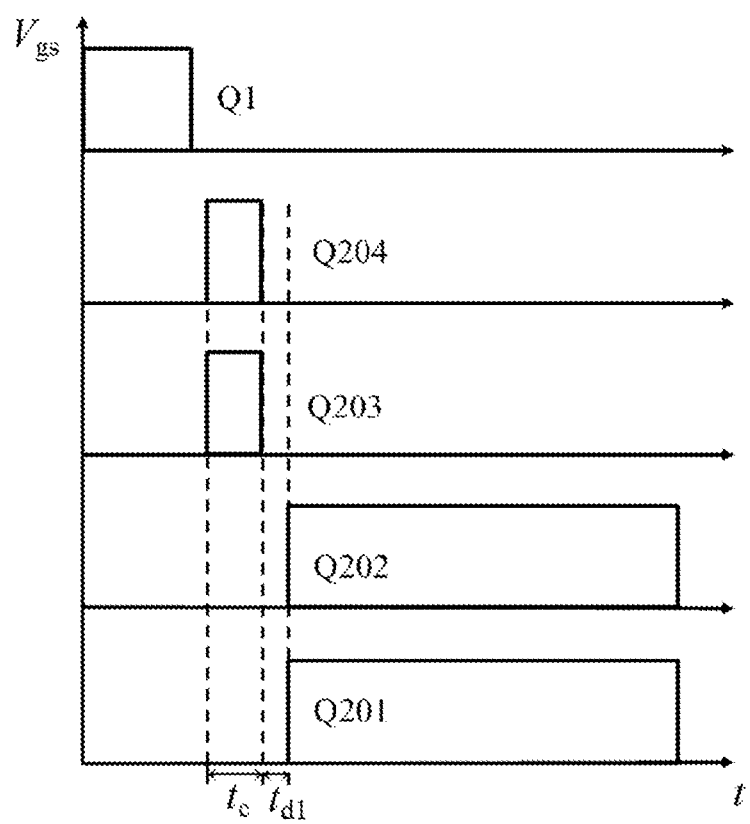
FIG. 6 schematically shows a timing diagram of driving signals of primary main switch, the first switch unit and the second switch unit in a power adapter according to still another embodiment of the present disclosure.

In some embodiments, the control circuit may control the first switch Q201 and the second switch Q202 to operate simultaneously and the third switch Q203 and the fourth switch Q204 to operate simultaneously. As shown in FIG. 6, the driving signals of the first switch Q201 and the second switch Q202 are same, the first switch Q201 and the second switch Q202 are turned on simultaneously and turned off simultaneously; and the driving signals of the third switch Q203 and the fourth switch Q204 are same, the third switch Q203 and the fourth switch Q204 are turned on simultaneously and turned off simultaneously. Further, in an embodiment of the present disclosure, the first switch Q201 and the second switch Q202 are turned off after being turned on for a time $t_c$, and then after a dead time $t_{d1}$, the third switch Q203 and the fourth switch Q204 are turned on, which prevents the two bidirectional switch units from being in a turn-on state at a same time.

In some other embodiments, the control circuit may also control driving signals of the first switch Q201 and the second switch Q202 to be asynchronous, and driving signals of the third switch Q203 and the fourth switch Q204 to be asynchronous.

Figure 7:
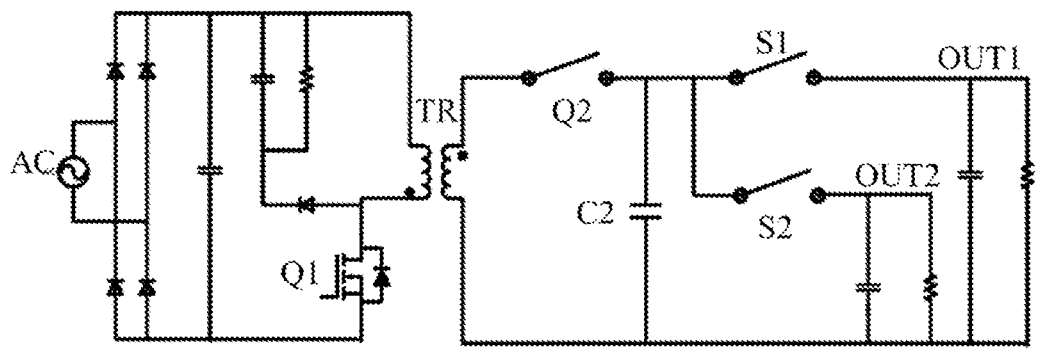
FIG. 7 is a schematic diagram showing a circuit structure of a power adapter according to another embodiment of the present disclosure.

Further, in some embodiments, as shown in FIG. 7, the secondary circuit of the flyback circuit further includes a secondary main switch Q2, having a first end and a second end. The first end of the secondary switch Q2 is connected to a first end of the secondary winding, and the second end is connected to the first end of the first switch unit S1 and the first end of the second switch unit S2. Further, the secondary circuit of the power adapter in the embodiment of the present disclosure includes an intermediate capacitor C2, a first end of the intermediate capacitor C2 is connected to the second end of the secondary main switch Q2, the first end of the first switch unit S1 and the first end of the second switch unit S2, and a second end of the intermediate capacitor C2 is connected to a second end of the secondary winding. The intermediate capacitor C2 may absorb a peak voltage of the secondary winding.

Figure 8:
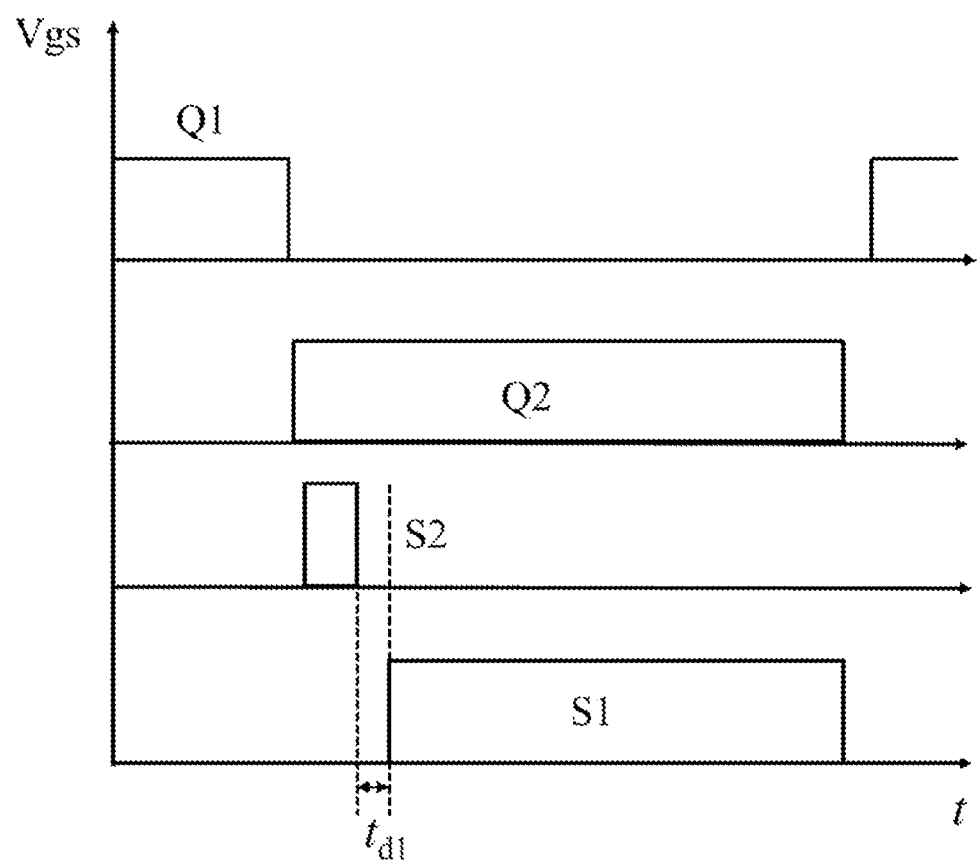
FIG. 8 schematically shows a timing diagram of driving signals of the primary main switch, the secondary main switch, the first switch unit and the second switch unit in a power adapter according to still another embodiment of the present disclosure.

FIG. 8 is a timing diagram of driving signals of the primary main switch, the secondary main switch, the first switch unit and the second switch unit in a power adapter according to an embodiment of the present disclosure. The secondary main switch Q2 is turned on after the primary main switch Q1 is turned off. Similarly, in some embodiments, during the time the primary side main switch Q1 is turned off, the control circuit controls the first switch unit S1 and the second switch unit S2 to be turned on alternatively, and the control circuit may set the dead time $t_{d1}$ between switching operations of the first switch unit S1 and the second switch unit S2 to prevent the two switch units from both being in a turn-on state at the same time.

Figure 9:
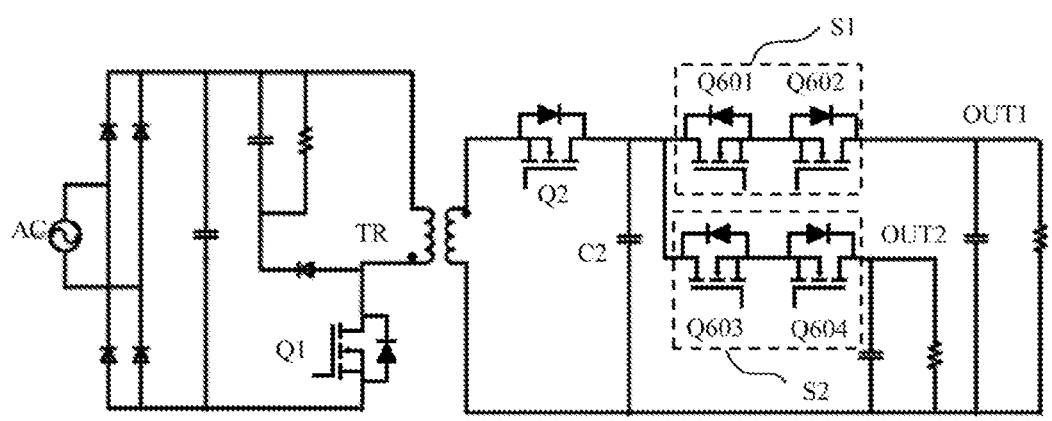
FIG. 9 is a schematic diagram showing a circuit structure of a power adapter according to still another embodiment of the present disclosure.

FIG. 9 is a schematic diagram of a circuit structure of a power adapter according to an embodiment of the present disclosure. As shown in FIG. 9, the flyback circuit includes a secondary main switch Q2 and an intermediate capacitor C2. A drain of a first switch Q601 is connected to a second end of the secondary main switch Q2, a source of the first switch Q601 is connected to a source of a second switch Q602, and a drain of the second switch Q602 is connected to the first output port OUT1; a drain of a third switch Q603 is connected to the second end of the secondary main switch Q2, a source of the third switch Q603 is connected to a source of a fourth switch Q604, and a drain of the fourth switch Q604 is connected to the second output port OUT2. In some embodiments, the first switch Q601, the second switch Q602, the third switch Q603, and the fourth switch Q604 may be MOSFETs, GaN devices, or SiC devices, which is not limited herein. In other embodiments, it may also be implemented by IGBT and reverse-paralleling diode connected at two ends of IGBT.

Similarly, the control circuit may control the first switch Q601, the second switch Q602, the third switch Q603, and the fourth switch Q604 to be periodically turned on and turned off to control the output voltage and output power of multiple output ports. In some embodiments, the control circuit may control the first switch Q601 and the second switch Q602 to operate simultaneously, and control the third switch Q603 and the fourth switch Q604 to operate simultaneously. That is, the driving signals of the first switch Q601 and the second switch Q602 are same, and the driving signals of the third switch Q603 and the fourth switch Q604 are same. Further, in some embodiments, there is a dead time td1 between the switching operations of the first switch unit S1 and the second switch unit S2 to prevent the first switch unit S1 and the second switch unit S2 from both being in a turn-on state at the same time.

Figure 10:
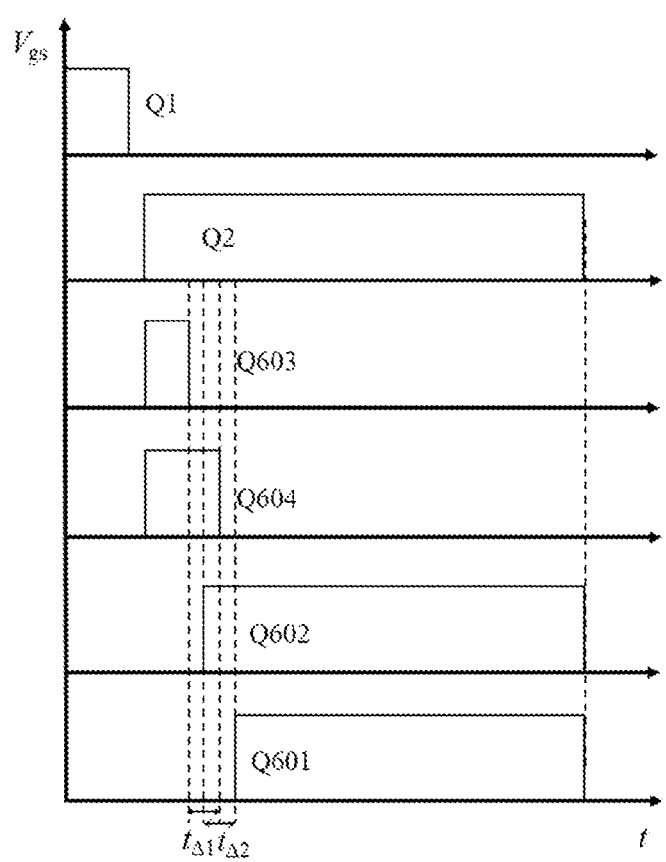
FIG. 10 schematically shows a timing diagram of driving signals of bidirectional switch units in a power adapter according to another embodiment of the disclosure.

In some other embodiments, the control circuit may also control the driving signals of the first switch Q601 and the second switch Q602 to be asynchronous, and control the driving signals of the third switch Q603 and the fourth switch Q604 to be asynchronous. Taking the circuit structure shown in FIG. 9 as an example, the driving signals output by the control circuit is shown in FIG. 10. Assuming that the output voltage of the second output port OUT2 is less than that of the first output port OUT1, the second switch unit S2 can be controlled to work first so that the second output port OUT2 supplies power to the load first. In some embodiments, the control circuit may also control the third switch Q603 and the fourth switch Q604 to be turned on simultaneously, and control the fourth switch Q604 to be turned off after the third switch Q603 is turned off, and may control the first switch Q601 and the second switch Q602 to be turned off simultaneously, and control the first switch Q601 to be turned on after the second switch Q602 is turned on. Further, as shown in FIG. 10, the control circuit may control the fourth switch Q604 to be turned off at a first preset period $t_{A1}$ after the third switch Q603 is turned off, and control the first switch Q601 to be turned on at a second preset period $t_{A2}$ after the second switch Q602 is turned on. The second switch Q602 and the fourth switch Q604 may realize ZVS soft-switching to reduce loss. In this case, the second switch Q602 is turned on before the fourth switch Q604 is turned off. In other embodiments, the second switch Q602 can be turned on after the fourth switch Q604 is turned off. The first switch Q601 needs to be turned on after the fourth switch Q604 is turned off to prevent the second output port OUT2 from supplying power to the first output port OUT1.

Alternatively, in some other embodiments, when the second output port OUT2 needs to provide power, the fourth switch Q604 may be turned on first, and then the third switch Q603 may be turned on, so that the fourth switch Q604 may realize ZVS to reduce loss. Further, when power supplying from the second output port OUT2 is finished in a switching period, the third switch Q603 and the fourth switch Q604 may be turned off simultaneously or the third switch Q603 may be turned off first and then the fourth switch Q604 may be turned off. Similarly, when the first output port OUT1 needs to provide power, the first switch Q601 and the second switch Q602 may be turned on simultaneously, or the second switch Q602 may be turned on first and then the first switch Q601 may be turned on. Further, when power supplying from the first output port OUT1 is finished in a switching period, the first switch Q601 and the second switch Q602 may be turned off simultaneously, or the first switch Q601 may be turned off first and then the second switch Q602 may be turned off, which is not limited herein.

In some embodiments, if the positions of the first switch Q601 and the second switch Q602 in FIG. 9 are exchanged, and the positions of the third switch Q603 and the fourth switch Q604 in FIG. 9 are exchanged, as the structure shown in FIG. 5, the driving signal of the first switch Q201 in FIG. 5 may be consistent with that of the second switch Q602 in FIG. 10, the driving of the second switch Q202 in FIG. 5 may be consistent with that of the first switch Q601 in FIG. 10, the driving signal of the third switch Q203 in FIG. 5 may be consistent with that of the fourth switch Q604 in FIG. 10, and the driving signal of the fourth switch Q204 in FIG. 5 may be consistent with that of the third switch Q603 in FIG. 10.

Figure 11:
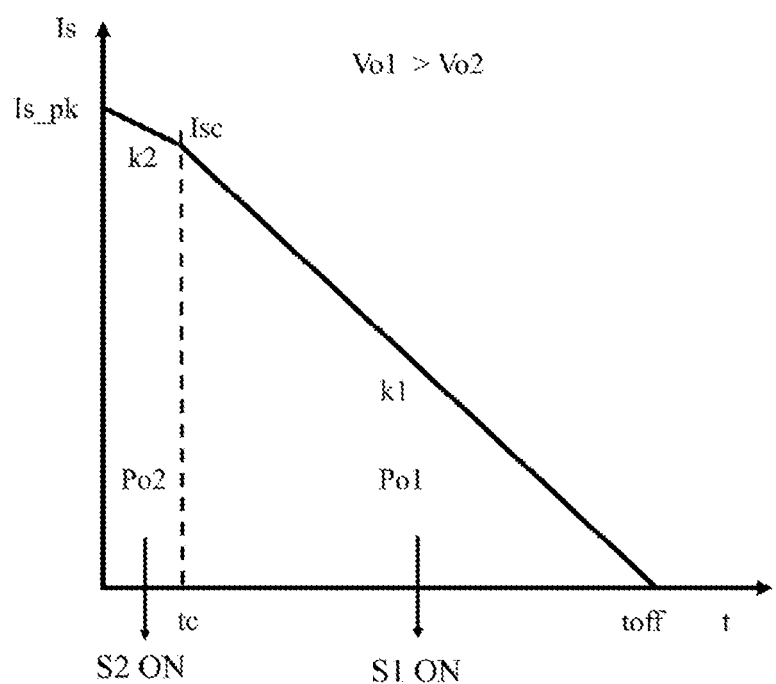
FIG. 11 shows a schematic diagram of current change of a power adapter according to an embodiment of the present disclosure.

Further, in some embodiments, the control circuit may control a switch unit with a lower output voltage to be turned on first, and the switch unit with a high output voltage to be turned on later. Specifically, as shown in FIG. 11, it is assumed that a first output voltage Vo1 of the first output port OUT1 is greater than a second output voltage Vo2 of the second output port OUT2, that is, Vo1>Vo2, the second switch unit S2 is turned on first, and then the first switch unit S1 is turned on later. As shown in FIG. 11, in an area indicated by an arrow S2 ON, for example, the third switch Q603 and the fourth switch Q604 are turned on, and the first switch Q601 and the second switch Q602 are turned off, and in this case, the output voltage of the second output port is Vo2 and the output power thereof is Po2, and in this case, a decreasing slope of a secondary current is k2=Vo2/Ls. In an area indicated by an arrow S1 ON, for example, the first switch Q601 and the second switch Q602 are turned on, and the third switch Q603 and the fourth switch Q604 are turned off, and in this case, the output voltage of the first output port is Vo1 and the output power is Po1, and in this case, the decreasing slope of the secondary current is k1=Vo1/Ls. In this mode, Vo1>Vo2, thus k1>k2, and the second switch unit S2 with a lower output voltage is turned on first, the slope of the secondary current is smaller, so the second switch unit S2 only needs to be turned on for a short time tc to meet output power requirements. After the second switch unit S2 is turned off, the first switch unit S1 is turned on until the secondary winding current is zero, and then the first switch unit S1 is turned off. Therefore, the switching cycle of the power adapter is short, the loss is small, and the efficiency is high. The second switch unit S1 may be controlled by the second control circuit 342 according to the output voltage Vo2 of the second output port, and the first switch unit S1 may not need to be controlled according to the output voltages. A switching frequency of the power adapter of this control method changes with the load, and the change range is relatively small, which is beneficial to design of the controller and design of EMI filter.

Figure 12:
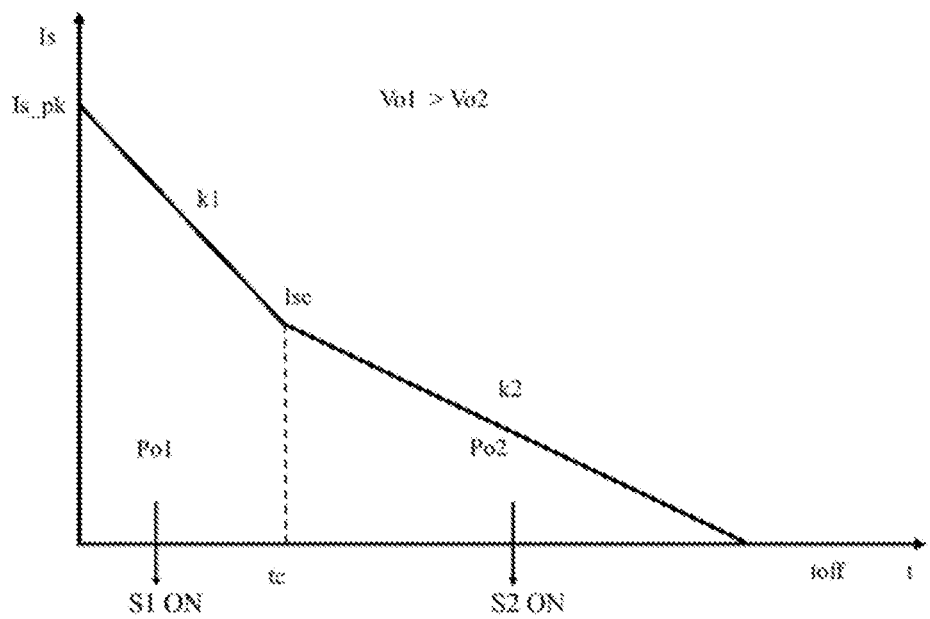
FIG. 12 shows a schematic diagram of current change of a power adapter according to another embodiment of the present disclosure.

In some other embodiments, as shown in FIG. 12, the first output port OUT1 may be turned on first, and then the second output port OUT2 is turned on. In an area indicated by an arrow S1 ON, for example, the first switch Q601 and the second switch Q602 are turned on, and the third switch Q603 and the fourth switch Q604 are turned off. In this case, the output voltage of the first output port is Vo1, and the output power is Po1. In an area indicated by an arrow S2 ON, for example, the third switch Q603 and the fourth switch Q604 are turned on, and the first switch Q601 and the second switch Q602 are turned off. In this case, the output voltage of the second output port is Vo2, and the output power thereof is Po2.

Figure 13:
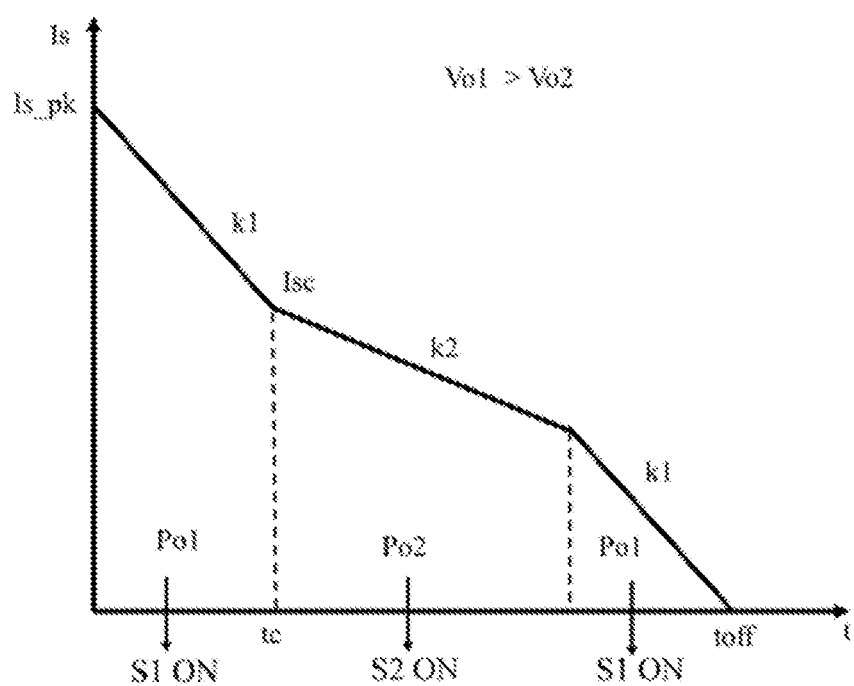
FIG. 13 shows a schematic diagram of current change of a power adapter according to still another embodiment of the present disclosure.

Further, in some embodiments, as shown in FIG. 13, the first switch unit S1 may be turned on to supply power to the first output port OUT1 firstly, and then the second switch unit S2 may be turned on to supply power to the second output port OUT2, and after that, the first switch unit S1 is turned on again to supply power to the first output port OUT1, so as to meet the output power requirement of each of the output ports.

In the power adapter according to the embodiments of the present disclosure, multiple switch units are disposed in a secondary circuit, each of the switch units is correspondingly connected to one output port, and output voltage and output power of the output port may be controlled by controlling the switch units, which achieves independent adjustment of the output voltage and flexible distribution of the output power for different output ports of the power adapter.

After considering the description and practicing the embodiments disclosed herein, those skilled in the art will easily think of other embodiments consistent with the disclosure. This application is intended to cover any variations, uses, or adaptive changes of the present disclosure that follow the general principles of the present disclosure and include common general knowledge or customary technical means in the technical field not disclosed by the present disclosure. The description and examples are to be considered exemplary only, and the true scope and spirit of the disclosure are pointed out by the attached claims.

It should be understood that the present disclosure is not limited to the precise structure that has been described above and shown in the drawings, and various modifications and changes may be made without departing from its scope. The scope of the disclosure is only limited by the appended claims.

What is claimed is:

1. A power adapter, comprising:
   a transformer, comprising a primary winding and a secondary winding;
   a primary circuit, comprising a primary main switch, electrically coupled to the primary winding;
   a secondary circuit, comprising a first switch unit and a second switch unit, wherein a first end of the first switch unit and a first end of the second switch unit are coupled to the secondary winding of the transformer, a second end of the first switch unit is connected to a first output port, a second end of the second switch unit is connected to a second output port, each of the first output port and the second output port being configured to supply power to a corresponding load; and
   a control circuit, configured to detect output voltages of the first output port and the second output port respectively, and control the primary main switch, the first switch unit and the second switch unit to adjust the output voltages of the first output port and the second output port,
   wherein the control circuit is configured to control the first switch unit and the second switch unit to be turned on alternately during a turn-off period of the primary main switch, and
   during the turn-off period of the primary main switch, the control circuit is configured to control one of the first switch unit and the second switch unit with a lower output voltage to be turned on first, and another one of the first switch unit and the second switch unit with a higher output voltage to be turned on later,
   wherein, the secondary circuit further comprises a secondary main switch having a first end and a second end, wherein the first end of the secondary main switch is connected to an end of the secondary winding, the second end of the secondary main switch is connected to the first end of the first switch unit and the first end of the second switch unit, and
   wherein the power adapter further comprises:
   an intermediate capacitor, wherein a first end of the intermediate capacitor is connected to the second end of the secondary main switch, the first end of the first switch unit and the first end of the second switch unit, and a second end of the intermediate capacitor is connected to another end of the secondary winding.

2. The power adapter according to claim 1, wherein,
   the control circuit is configured to generate a feedback signal to control the primary main switch according to an output voltage of one of the first output port and the second output port; and
   the control circuit is configured to control the switch unit corresponding to another one of the first output port and the second output port according to an output voltage of the another one of the first output port and the second output port.

3. The power adapter according to claim 1, wherein, the secondary main switch is turned on after the primary main switch is turned off.

4. The power adapter according to claim 1, wherein, the control circuit is configured to set a dead time between switching operations of the first switch unit and the second switch unit.

5. The power adapter according to claim 1, wherein, the control circuit comprises:
a first control circuit, configured to detect an output voltage of one of the first output port and the second output port and generate a feedback signal to control the primary main switch according to the output voltage of the one of the first output port and the second output port; and
a second control circuit, configured to detect an output voltage of another one of the first output port and the second output port, and control the switch unit corresponding to the another one of the first output port and the second output port according to the output voltage of the another one of the first output port and the second output port.

6. The power adapter according to claim 5, wherein, the switch unit corresponding to the another one of the first output port and the second output port controlled by the second control circuit is turned on first, and the switch unit corresponding to the one of the first output port and the second output port is turned on later.

7. The power adapter according to claim 6, wherein, the switch unit corresponding to the one of the first output port and the second output port turned on later is turned off when a current of the secondary winding is zero.

8. The power adapter according to claim 1, wherein, each of the first switch unit and the second switch unit is a bidirectional switch unit configured to achieve conduction or block of a bidirectional voltage and a bidirectional current.

9. The power adapter according to claim 1, wherein, the first switch unit and the second switch unit comprise a plurality of switch devices connected in series or in parallel; and the switch devices comprise MOSFETs, GaN devices, or SiC devices.

10. The power adapter according to claim 9, wherein, the switch devices in a same switch unit are turned on synchronously or asynchronously; and
the switch devices in a same switch unit are turned off synchronously or asynchronously.

11. The power adapter according to claim 9, wherein, the first switch unit comprises a first switch and a second switch connected in reverse-series, and the second switch unit comprises a third switch and a fourth switch connected in reverse-series.

12. The power adapter according to claim 11, wherein,
a drain of the first switch is coupled to the secondary winding, a source of the first switch is connected to a source of the second switch, and a drain of the second switch is coupled to the first output port; and
a drain of the third switch is coupled to the secondary winding, a source of the third switch is connected to a source of the fourth switch, and a drain of the fourth switch is connected to the second output port.

13. The power adapter according to claim 12, wherein, in a switching period, when the control circuit controls the second switch unit to work first and the first switch unit to work later,
the control circuit is configured to control the fourth switch to be turned off after the third switch is turned off, control the second switch to be turned on before the first switch is turned on, and control the first switch to be turned on after the fourth switch is turn off.

14. The power adapter according to claim 13, wherein,
the control circuit is configured to control the second switch to be turned off after the first switch is turned off, and control the fourth switch to be turned on before the third switch is turned on.

15. The power adapter according to claim 1, further comprising:
an active clamp circuit, connected with the primary winding in parallel or connected with the primary main switch in parallel, wherein, the active clamp circuit comprises a clamping switch and a clamping capacitor connected in series.

16. The power adapter according to claim 1, wherein, the first output port and the second output port are suitable for USB PD Type-C.

* * * * *

UNITED STATES PATENT AND TRADEMARK OFFICE
CERTIFICATE OF CORRECTION

| | | |
|---|---|---|
| PATENT NO. | : 11,616,449 B2 | |
| APPLICATION NO. | : 17/212056 | |
| DATED | : March 28, 2023 | |
| INVENTOR(S) | : Jian Zhou et al. | |

It is certified that error appears in the above-identified patent and that said Letters Patent is hereby corrected as shown below:

On the Title Page

Item [30] SHOULD READ:
Apr. 3, 2020 (CN)............202010258072.1
Mar. 18, 2021 (CN)...........202110292275.7

Signed and Sealed this
Ninth Day of May, 2023

Katherine Kelly Vidal
*Director of the United States Patent and Trademark Office*